United States Patent Office 3,772,422
Patented Nov. 13, 1973

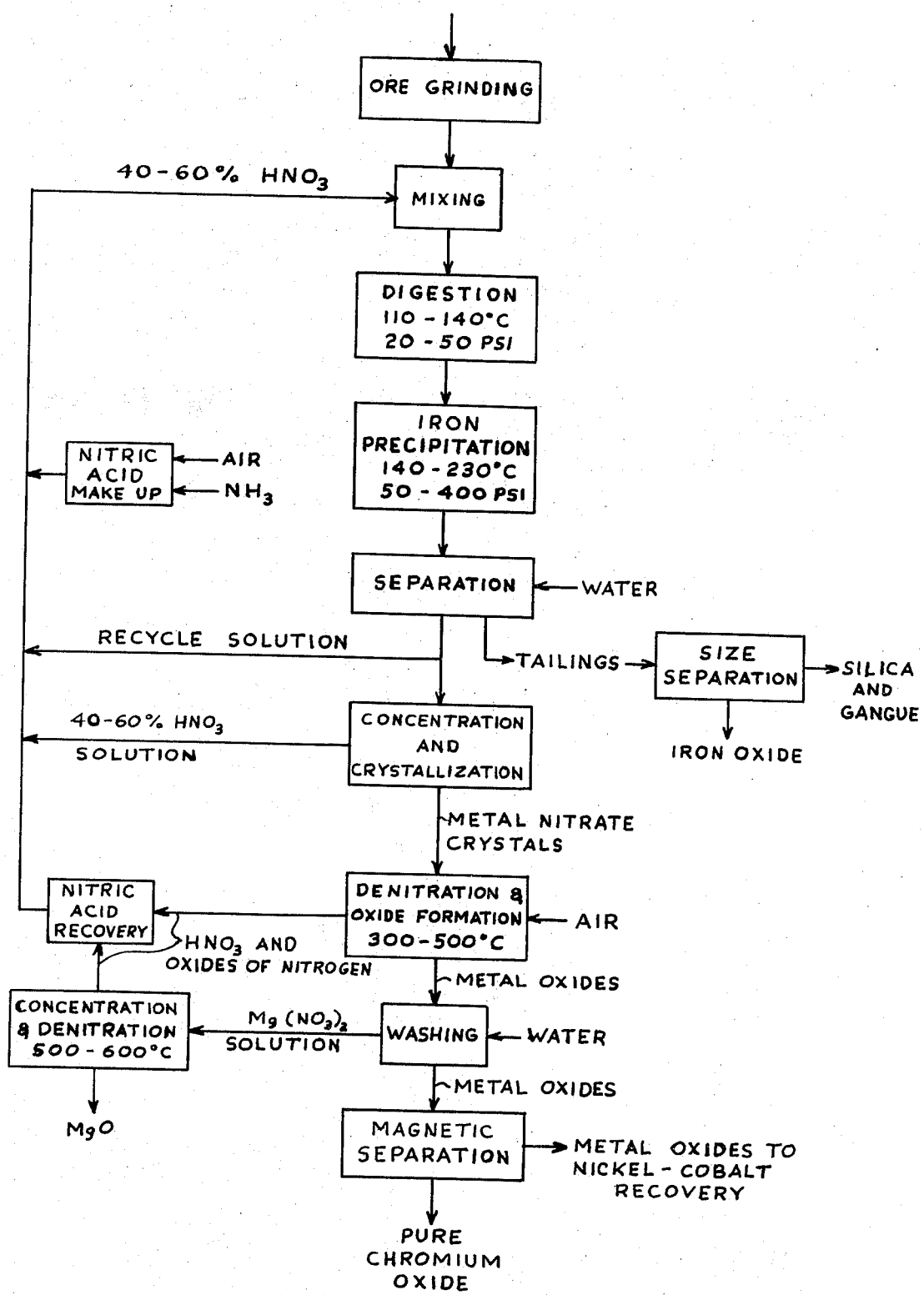

3,772,422
PROCESS FOR THE SELECTIVE RECOVERY OF CHROMIUM FROM CHROMIUM CONTAINING MATERIALS AND SOLUTIONS
Melvin L. Taylor, 5990 Dudley St., Arvada, Colo. 80002
Filed Sept. 7, 1971, Ser. No. 178,336
Int. Cl. C01g 37/02
U.S. Cl. 423—56                                                                 7 Claims

ABSTRACT OF THE DISCLOSURE

This invention relates to a process for the selective recovery of chromium from oxidic nickeliferrous ores such as low grade lateritic, liminite ores containing chromium along with nickel, cobalt, and substantial amounts of iron. The process of the invention involves the dissolution of chromium and other metals in nickeliferrous lateritic ores using concentrated nitric acid. Nitric acid of 40–60% concentration is premixed with ore and heated to a temperature of 110°–140° C., preferably 110°–120° C., in an autoclave whereby the chromium, iron and other acid soluble non-ferrous metals are leached from the ore. The leach solution and the undissolved solids are then heated further in the temperature range of 140°–230° C. in an autoclave whereby most of the iron nitrate in solution hydrolyzes to form iron oxide and nitric acid while the chromium and other non-ferrous metals remain in solution. After the liquid-solids separation, the clarified mixed nitrates liquor is evaporated until the metal nitrate hydrates are crystallized from the nitric acid solution. The metal nitrate hydrate crystals are separated from 40–60% nitric acid solution.

The metal nitrates are dehydrated and decomposed at a temperature in the range of 300–500° C., preferably at 400° C., in an air atmosphere. The nitric acid vapors and nitrogen oxides driven off during decomposition are recovered and recycled back to the acid and ore pre-mix step. The solids composed of metal oxides of chromium, nickel, cobalt, iron, aluminum, manganese, copper, lead, and zinc are washed to remove the undecomposed magnesium and calcium nitrates.

It is an object of the invention that the chromium oxide formed during the decomposition of chromium nitrate is strongly magnetic and can be separated selectively from the other non-magnetic metal oxides by using magnetic separation methods.

The nickel and cobalt can be recovered from the remaining mixtures of metal oxides by the well known methods employing ammonia. Iron oxide can be recovered from the tailing from the pressure leach by size separation at about 10–15 microns to remove substantial portions of the silica and undissolved chromium.

This invention can also be applied to the selective recovery of chromium from chromium-containing alloy scrap metals or chromium-containing solutions, such as exhausted stainless steel pickling solutions generated by the steel industries.

STATE OF THE ART

Up to the present time, chromium has been recovered substantially only from high grade ores generally containing from 50–60% chromium as chromic oxide, in combination with 12–25% iron, as ferrous oxide. As far as is known, no one has provided an economically acceptable process for the recovery of chromium from minerals or ores of very low grade, as those containing less than about five percent chromium, although numerous ores exist which contain this small chromium content, the chromium being in combination with three and a half to five times as much iron and with small amounts of other valuable metals which could be recovered.

In U.S. Pat. 2,916,357, a process is described for recovering a pure iron oxide from iron bearing minerals using a nitric acid leach at 90° C. using 50 p.s.i.g. oxygen overpressure. The patent states that the quantity of nitric acid used should be in stoichiometric excess of iron plus non-ferrous metal values to be dissolved and some 5 to 25 percent excess may be used, usually about 10 percent. After leaching for 3–24 hours, the liquid solids separation is made and the free acid in the leach solution is neutralized in part with fresh ore for 5 hours at 60°–80° C. The solution of increased iron content is sent to iron oxide precipitation at a temperature from 150° C. to about 230° C. In this temperature range the iron nitrate hydrolyzes to form iron oxide and nitric acid. The iron oxide, which is about 10–15 microns in particle size, is easily filtered or separated by decantation. The resulting clarified nitrate and nitric acid solution contains the dissolved nickel, cobalt, chromium, manganese, magnesium, and the unhydrolyzed iron. Sulfuric acid is added to the solution and the nitric acid is recovered by distillation. Thereafter, dissolved nickel and cobalt values were jointly precipitated as their sulfides by known methods. Although the patent states that the separation and recovery of chromium is an attendant benefit, no details are given for its recovery other than claiming that after the ferric oxide precipitation step, the residual solution can be reacted with sulfuric acid to convert dissolved non-ferrous metal nitrates to sulphates and released nitric acid is recycled to the leaching step, then the metal bearing sulphate solution can be reacted with hydrogen sulphide to precipitate dissolved non-ferrous metal values as sulphides.

The patent further states that leaching nickeliferrous lateritic ores with limited amounts of nitric acid, at from 160°–350° C., in an attempt to dissolve only non-ferrous metals, is not sufficiently selective for many purposes. It is most useful when nickel and cobalt are the desired products, and chromium and iron are not leached to any significant degree. This is evident in U.S. patent application. Ser. No. 67,249, filed Aug. 26, 1970, by Melvin L. Taylor and Nelson J. Ronzio, for "Treatment of Nickel Leach Liquor" now U.S. Pat. No. 3,720,749 issued Mar. 13, 1973, in which a nickeliferrous lateritic oxide ore, analyzing 1.02% Ni, 0.105% Co, 47.0% Fe, 1.9% Al, 1.13% acid soluble Cr, 3.1% total Cr, 0.69% Mn, 0.42% Mg, 4.6% $SiO_2$ and 0.002% Ca, was mixed with nitric acid solution to provide 0.37 pound of acid per pound of dry ore and a pulp of 35% solids. The ore was leached in an autoclave at about 240° C. for 60 minutes. No mention was made of any significant chromium dissolution. An example indicated the chromium content in the leach liquors to be about 0.3 g.p.l. The object of that application was to selectively remove dissolved iron, aluminum and chromium from solution by addition of a base at a temperature of about 240° C. in an autoclave, thereby obtaining a purified nickel and cobalt nitrate solution.

A method has now been discovered whereby chromium can be selectively recovered from lateritic limonitic ores containing chromium.

OBJECT OF THE INVENTION

It is thus an object of the invention to provide a process whereby chromium can be selectively recovered by magnetic methods from a mixture of metal oxides produced by the thermal decomposition of metal nitrates containing chromium nitrate at 300° to 500° C., preferably 400° C. in an air atmosphere. The metal nitrates are obtained by nitric acid leaching of lateritic limonitic ores containing chromium and other valuable metals, nickel and cobalt. This process is very economical since nickel and cobalt can be recovered from the mixture of metal oxide remaining after the separation of chromium oxide.

The object of the invention will more clearly appear when taken in conjunction with the following description and drawing, FIG. 1, which is a flowsheet for carrying out the invention.

STATEMENT OF INVENTION

Stating it broadly, the present invention is directed towards the selective recovery of chromium from chromium containing materials, such as low-grade ore, wherein a pulp of the ore is leached with a solution of 40–60% nitric acid in sufficient quantity to solubilize substantially all of the acid soluble constituents in the ore with approximately 5–25% excess nitric acid over the stoichiometric requirement for the metal constituents. These constituents are chromium, cobalt, nickel, iron, aluminum, manganese and magnesium. The conditions are such that substantially all of these constituents dissolve in the acid solution and after further heating to a higher temperature for a sufficient time until most of the iron has precipitated from solution while the dissolved chromium, and other non-ferrous metals remain in solution. The ore leaching will be accomplished at about 110° C. to 140° C. preferably 110° to 120° C., in an autoclave with or without air overpressure of about 50–150 p.s.i. depending upon the ferrous iron content in the ore. The purpose of the air is to oxidize ferrous iron to the ferric form. The temperature at which the iron nitrate hydrolyzes will be dependent upon the quantity of non-ferrous metals in solution and the degree of iron precipitation obtainable without co-precipitation of the non-ferrous metals in solution. This temperature will be in the range of 140° to 230° C., usually at 200° to 220° C.

A liquid-solids separation can be easily made since the iron oxide precipitated by hydrolysis of iron nitrate is free settling and easily collected by filtration or decantation. The precipitate is comprised of hard, black ferric oxide crystals usually averaging about 10 to 15 microns in particle size. The solution containing free nitric acid, chromium and other non-ferrous metals along with the unhydrolyzed iron is recycled to another leach until the desired concentration of non-ferrous metals in solution is attained. The solution is usually recycled five times, then 80% of the solution is recycled to the ore and acid premix step of the process. Twenty percent of the solution is withdrawn to recover chromium and other valuable non-ferrous metals in solution. This solution is concentrated by evaporation until the metal nitrates crystallize from solution. The nitric acid concentration in the concentration solution is 40–60% to effect the crystallization of the metal nitrates. The metal nitrate crystals are separated from the 40–60% nitric acid solution, and the acid solution is recycled back to the acid and ore premix step of the process.

The separated metal nitrate crystals containing chromium nitrate and the other metal nitrates is then thermally decomposed in a temperature range of 300° to 500° C., preferably 400° C., in an air atmosphere, forming metal oxides. The nitric acid and oxides of nitrogen released during decomposition is collected and recycled back to the premix step. At 400° C. in an air atmosphere, the chromium oxide formed from the decomposition of chromium nitrate is strongly magnetic and can be separated from the other metal oxides which are non-magnetic. Magnesium and calcium nitrate are not decomposed at 400° C. and can be separated from the other metal oxides by washing. These nitrates can be decomposed at 550° C. to recover nitric acid.

The metal oxides remaining after the separation of chromium oxide contain nickel and cobalt, which can be recovered from the metal oxide mixture by the well known ammonia leach method. Other valuable metals such as aluminum and manganese in the mixture of metal oxides could also be recovered.

An iron oxide product can be recovered from the tailings from the pressure leach step by size separation at about 10–15 microns.

DETAILS OF THE INVENTION

Example 1

In practice one kilogram of a dry New Caledonia nickeliferous laterite ore of the following composition: 1.02% Ni, 0.105% Co, 47.0% Fe, 1.9% Al, 1.13% acid soluble Cr, 3.1% total Cr, 0.69% Mn, 0.42% Mg, 4.6% $SiO_2$, and 0.002% Ca, would be ground to minus 20 mesh size and slurried to about 45% solids. About 5.0 kilograms of 40% nitric acid solution would be mixed with the ore resulting in a pulp of 12.1% solids. The premixed pulp would then be heated to 110°–120° C. in an autoclave at about 6 to 14 p.s.i.g. pressure and maintained at that temperature for 3 hours to dissolve about 90–95% of the acid soluble constituents in the ore. Then the pulp would be heated to 210° to 215° C. in an autoclave at about 260 to 290 p.s.i.g. for about one hour. The solids would be separated by decantation and the solution containing the dissolved chromium, nickel, cobalt, aluminum, manganese, magnesium, residual iron, and nitric acid would be recycled to another premix step with an additional batch of ore and make-up nitric acid. After repeating this procedure for five cycles, thereafter about 80% of the solution would be returned in each cycle. The remainder of the solution which would contain about 7.0 parts chromium, 6.4 parts nickel, 0.7 parts cobalt, 11.8 parts aluminum, 4.4 parts manganese, 13.5 parts iron, 2.6 parts magnesium, 220 parts nitric acid, is withdrawn and evaporated until the nitric acid concentration is in the 40–60% range to crystallize the metal nitrates from solution. The metal nitrate crystals would be separated and the nitric acid would be recycled to the ore premix step. The metal nitrate crystals would then be dehydrated and decomposed by heating to 400° C. for 2 hours in an air atmosphere. The nitric acid vapors and oxides of nitrogen would be recovered and recycled to the ore premix step. The magnesium nitrate would not decompose to any significant degree at 400° C. and could be washed from the mixture of metal oxides. The metal oxides would weight about 103 grams on a dry basis. The composition of the mixture would be about 15.3% $Cr_2O_3$, 12.0% NiO, 1.1% CoO, 28.6% $Fe_2O_3$, 33.2% $Al_2O_3$, 9.8% $MnO_2$ with minor amounts of copper, lead, and zinc. About 15.7 grams of chromium oxide would then be selectively separated by magnetic methods from the other metal oxides. After separation of the chromium oxide, the remaining mixture of oxides on a dry basis would weigh about 87 grams and the composition would be about 14.1% NiO, 1.3% CoO, 33.7% $Fe_2O_3$, 39.2% $Al_2O_3$, 11.6% $MnO_2$ with minor amounts of copper, lead, and zinc. The nickel and cobalt could be recovered from this mixture of metal oxides by the well known ammonia leaching method.

About 85% of the iron in the ore could be recovered as ferric oxide from the tailings from the pressure leach by size separation at 10–15 microns.

Example 2

An object of this invention is based on the formation of a magnetic chromium oxide by the decomposition of chromium nitrate hydrate. Three hundred grams of reagent grade $Cr(NO_3)_3 \cdot 9H_2O$ was placed in an evaporating dish and placed in a cool furnace with air purging the heating chamber. The crystals were heated to 400° C. and maintained at 400° C. for 2 hours with air continuously purging the chamber. A greenish black product was produced which after cooling weighed 57.9 grams. This chromium oxide product was strongly magnetic.

When ferric nitrate crystals were heated to 400° C. for 2 hours with air purging the chamber, a red colored product was made. This ferric oxide product was not magnetic.

In connection with Example 2, the temperature of the furnace should be maintained such that any ferrous nitrate which may be present in the mixture of metal nitrates will decompose (which is known to be within the temperature range of approximately 60 to 90° C.) but will not cause decomposition of any of the other metal nitrates (which are known to occur or believed to begin as low as 105 to 125 up to 140 to 150° C. or more). It will be understood that the undecomposed metal nitrates will be solubilized with water to separate the ferrous oxide from the mixture. The decomposition of the solubilized metal nitrates will be accomplished as described above.

The invention is applicable to the treatment of lateritic, limonite ores in general such as are found in New Caledonia, the Philippines, Brazil, Venezuela, and Indonesia. The present invention is particularly adapted for use in the recovery of chromium, nickel, cobalt, iron and magnesium from oxidic nickeliferrous ores, e.g. lateritic ores of the limonite type. Other valuable metals such as aluminum and manganese could also be recovered. The ores contain on the average of about 0.5% to 2% nickel, up to 0.5% cobalt, up to 50% or more of iron, up to 10% silicon (or silica), up to 5% aluminum, up to 4% chromium, up to 0.1% copper, up to 0.1% of lead, up to 2% manganese, and up to 8% or 12% magnesia.

Serpentine type ores containing high magnesia and silica contents and low chromium could also be treated by this process.

The invention is also applicable to the selective recovery of chromium from chromium containing alloy scrap metals such as stainless steels and the like including exhausted stainless steel picking solution containing chromium, nickel, iron, nitric acid and HF. It would also be possible to recover nickel and iron by this process. In order to apply the invention to these alloy scraps may require a pretreatment such as melting and atomizing of the scrap and grinding finely. It would be necessary to use air at 50 to 150 p.s.i.g. in the autoclave digestion step at 110° C. to 140° C. with 40–60% nitric acid in sufficient quantity to dissolve the alloy scraps. The remainder of the process would be identical to the processing steps described herein.

Although the present invention has been described in conjunction with preferred embodiments it is to be understood that modifications and variations may be resorted to without departing from the spirit and scope of the invention as those skilled in the art will readily understand. Such modification and variations are considered to be within the purview and scope of the invention and the appended claims.

I claim:
1. A process for the selective recovery of chromium as chromium oxide from chromium containing materials, such as nickeliferrous lateritic oxide ores, comprising the steps of grinding the chromium containing material, leaching the material with 40–60% nitric acid in a stoichiometric excess of nitric acid of between about 5% and about 25% by weight at from about 110° C. to about 140° C., heating the leach solution and undissolved residue to between about 140° C. and about 230° C. in a closed vessel to precipitate dissolved iron values as ferric oxide, separating the chromium bearing leach solution from the residue, recycling a portion of the chromium bearing leaching solution to the leaching step, concentrating and crystallizing chromium nitrates and other metal nitrates from a portion of the leaching solution, thermally decomposing the chromium nitrates and metal nitrates at between about 30° C. and about 500° C. in an air atmosphere to produce a mixture of chromium oxides and metal oxides, recovering nitric acid and oxides of nitrogen and recycling said nitric acid and oxides of nitrogen to the leaching step, and magnetically separating chromium oxide selectively from the mixture of metal oxides.

2. The process of claim 1 in which the extraction with nitric acid is carried out at a temperature between 110° C. and 120° C.

3. The process of claim 1 in which an air pressure of 50 to 150 p.s.i. is maintained at 110° C. to 140° C. in a closed vessel.

4. The process of claim 1 in which the temperature in the iron precipitation step is maintained at 200° C. to 220° C. and a pressure of about 225 to 340 p.s.i. in a closed vessel.

5. The process of claim 1 in which the thermal decomposition of the crystallized metal nitrates is carried out at a temperature of about 400° C. for at least about 2 hours in an air atmosphere.

6. The process of claim 1 including the step of recovering nickel and cobalt by ammonia leaching from the mixture of metal oxides after chromium oxide separation.

7. The process of claim 1 including the step of recovering iron oxide from the precipitated ferric oxide.

References Cited
UNITED STATES PATENTS

| | | | |
|---|---|---|---|
| 2,746,856 | 5/1956 | Mancke | 75—101 R |
| 2,762,703 | 9/1956 | Mancke | 75—101 R |
| 2,916,357 | 12/1959 | Schaufelberger. | |

HERBERT T. CARTER, Examiner

U.S. Cl. X.R.

423—53, 140, 143, 152

UNITED STATES PATENT OFFICE
CERTIFICATE OF CORRECTION

Patent No. 3,772,422          Dated November 13, 1973

Inventor(s) Melvin L. Taylor

It is certified that error appears in the above-identified patent and that said Letters Patent are hereby corrected as shown below:

Column 1, Line 13, "liminite" should read --limonite--

Column 1, Line 49, "mixtures" should read --mixture--

Column 6, Line 15, "30° C." should read --300° C.--

Signed and sealed this 16th day of April 1974.

(SEAL)
Attest:

EDWARD M.FLETCHER,JR.                C. MARSHALL DANN
Attesting Officer                    Commissioner of Patents